United States Patent [19]

Kashio

[11] 4,191,999

[45] Mar. 4, 1980

[54] SYSTEM OF DISPLAYING TO A CUSTOMER AN AMOUNT OF PAPER MONEY DELIVERED AS A CHANGE

[75] Inventor: Toshio Kashio, Tokyo, Japan

[73] Assignee: Casio Computer Co., Ltd., Tokyo, Japan

[21] Appl. No.: 923,499

[22] Filed: Jul. 11, 1978

[30] Foreign Application Priority Data

Jul. 15, 1977 [JP] Japan .................................. 52-84850

[51] Int. Cl.² ............................................. G06F 15/20
[52] U.S. Cl. .................................... 364/405; 235/7 A
[58] Field of Search ................ 364/405; 235/7 A, 23; 133/2, 4 A

[56] References Cited

U.S. PATENT DOCUMENTS

| 2,950,047 | 8/1960 | Barberis | 235/23 X |
| 2,975,789 | 3/1961 | Schmidt | 235/7 A |
| 4,070,564 | 1/1978 | Tucker | 364/405 |

*Primary Examiner*—David H. Malzahn
*Attorney, Agent, or Firm*—Frishauf, Holtz, Goodman and Woodward

[57] ABSTRACT

An electronic apparatus provided with a device for figuring out a change amount and for automatically dispensing coins as part of said change, which further comprises a system of displaying to a customer an amount of that remainder of said change which is paid back to him in paper money.

2 Claims, 7 Drawing Figures

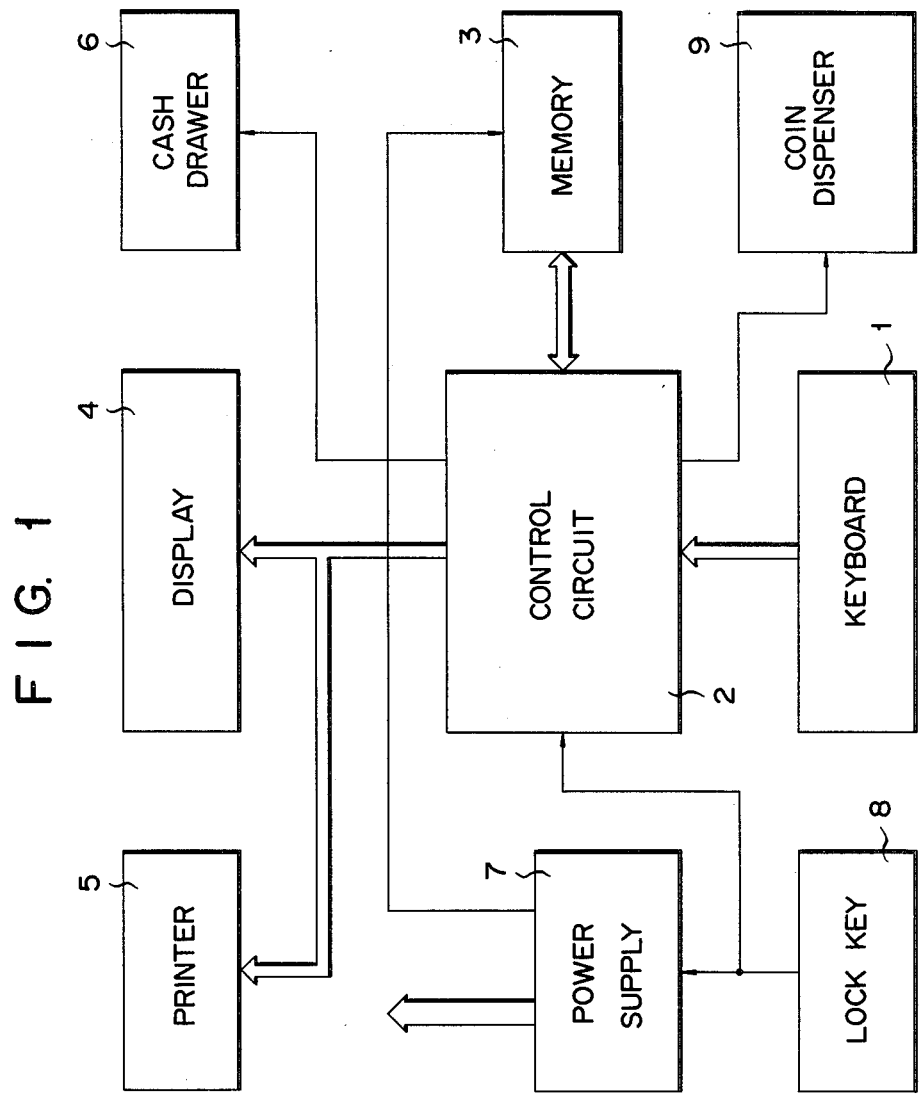

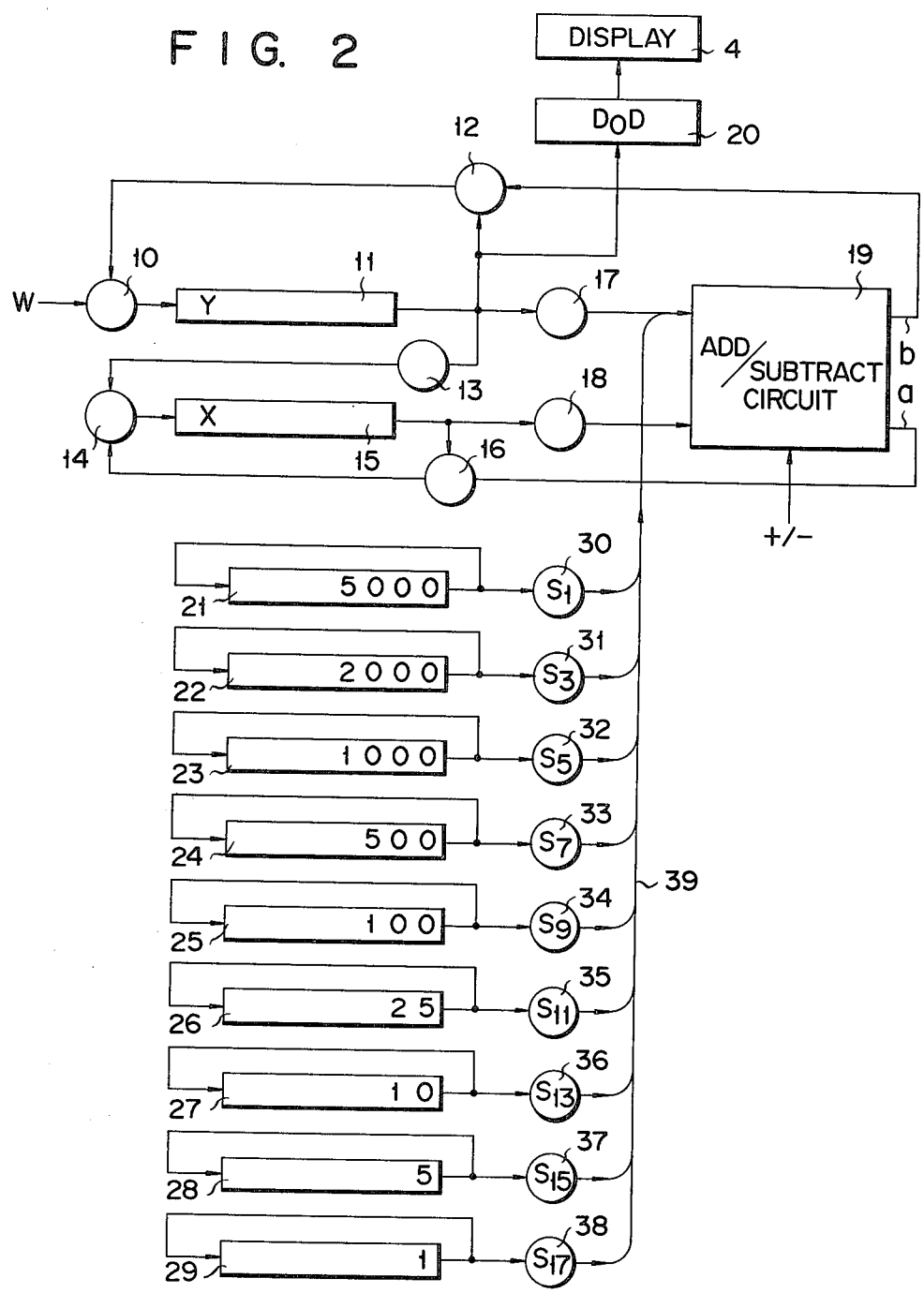

F I G. 4A

| | Y REGISTER | X REGISTER |
|---|---|---|
| TOTAL SALES AMOUNT | 23548 | |
| AMOUNT RECEIVED | 30000 | 23548 |
| CHANGE AMOUNT | | 6452 |
| S1  X − 5000 | 1 | 1452 |
| S3  X − 2000 | 10 | 1452 |
| S5  X − 1000 | 101 | 452 |
| S7  X − 500 | 1010 | 452 |
| S9  X − 100 | 10104 | 52 |
| S11  X − 25 | 101042 | 2 |
| S13  X − 10 | 1010420 | 2 |

# SYSTEM OF DISPLAYING TO A CUSTOMER AN AMOUNT OF PAPER MONEY DELIVERED AS A CHANGE

Background of the Invention

This invention relates to an electronic apparatus provided with a device for figuring out the change and automatically dispensing coins as the first part of said change, which further comprises a system of displaying to a customer an amount of that remainder of said change which is paid back to him in paper money.

Some of the known electronic cash registers are provided with a device for automatically dispensing coins as change. When, however, a customer tenders paper money of higher value than the amount due, and the change is to be delivered to him in coins and paper money, then an operator of the above-mentioned customary cash register gives him only the coins from a coin dispenser and passes the paper money to him by hand. In such case, a customer sometimes forgets to receive the paper money, though taking the coins. Moreover, the customer could not quickly recognize the numbers of paper notes for the respective denominations which were to be paid back to him as the remainder of the change.

This invention has been accomplished in view of the above-mentioned circumstances, and is intended to provide a system for displaying to a customer an amount of paper money delivered as part of the change due to him.

Summary of the Invention

The present invention provides an electronic apparatus provided with a device for figuring out a change amount and automatically dispensing coins as part of said change, which further comprises a paper money amount-displaying system including means for calculating an amount of that remainder of said change which is to be paid back to a customer in paper money, and means for displaying the amount of said paper money to him. Therefore, this invention enables the customer unfailingly to recognize that the change due to him includes paper money and prevents him from forgetting to receive said paper money. A further advantage of the invention is to inform the customer of the correct amounts of paper notes for the respective denominations which are paid back to him as the remainder of the change.

Brief Description of the Drawings

FIG. 1 is a block circuit diagram of an entire electronic cash register embodying this invention;

FIG. 2 shows the detailed arrangement of the control circuit 2 and memory 3 of FIG. 1;

FIGS. 4A and 4B show the manner in which a total amount of sales to a customer, an amount received by a cash register or an amount tendered by him and an amount of change payable back to him are registered in the cash register.

Detailed Description

Figure 3A:
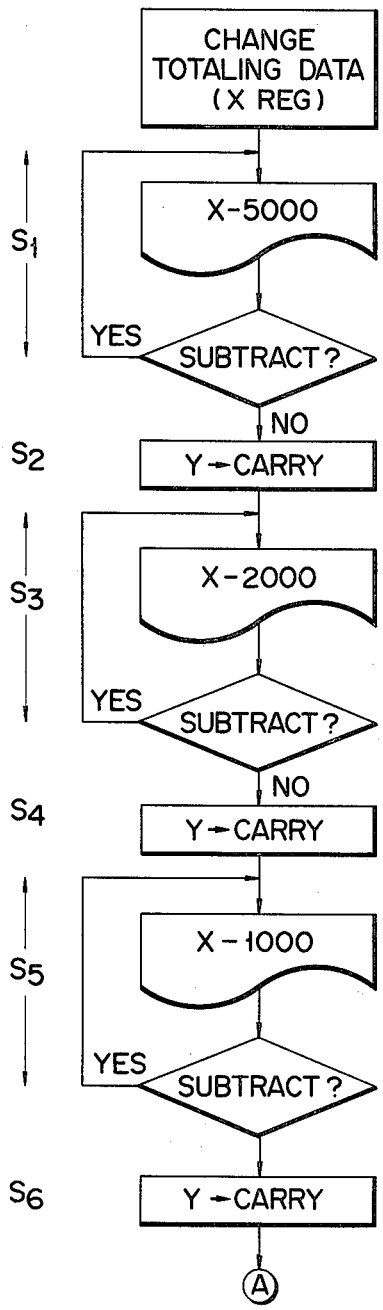
FIGS. 3(A), 3(B) and 3(C) are flow charts showing the processes for counting a number of paper notes for each denomination to be delivered as part of a change.

There will now be described by reference to the accompanying drawings a paper money change—displaying systems embodying this invention. FIG. 1 is a block circuit diagram of an entire electronic cash register provided with said paper money change—displaying system. Referential numeral 1 is a keyboard provided with various keys such as department keys indicating the categories to which articles sold belong, ten keys, function keys, amount key, desk key, % key, transaction key, clear key and a plurality of money denomination keys. Data supplied by operation of a key on the keyboard 1 is conducted to a control circuit 2. The control circuit 2 is connected to a memory 3 for storing for example, preset data and sales amounts. Data delivered from the keyboard 1 in subjected to an arithmetic operation. The results of said operation are stored in the memory 3. Data supplied from the keyboard 1, the results of arithmetic operation delivered from the control circuit 2, data on the change or a number of coins and that of paper notes constituting the remainder of said change are sent forth from the control circuit 2 to a display section 4 and also to a printer 5 to be impressed on a slip. A control signal issued from the control circuit 2 controls the operation of a cash drawer for keeping sales money. Referential numeral 7 is a power source for supplying driving power to the various sections of the cash register. A lock key 8 allows the operation of the power source 7 and control circuit 2. When the lock key 8 is not inserted, the power source 7 and control circuit 2 remain in operative. When the lock key 8 is inserted, the inoperative condition is released, to cause the power source 7 and control circuit 2 to be rendered conducting ready for commencement of supply of data from the keyboard 1. The control circuit 2 is connected to a coin dispenser 9. Upon receipt of a signal denoting a number for each denomination of coins included in the change defined by the arithmetic operation carried out by the control circuit 2, the coin dispenser 9 discharges the corresponding coins on to a receptacle. Even while the lock key 8 is not inserted, the memory 3 continues to be supplied with power to hold data already stored therein.

FIG. 2 shows in greater detail those parts of the control circuit 2 and memory 3 of FIG. 1 which are related to this invention. The price of an article purchased by a customer is supplied to the cash register by operation of the keyboard 1 of FIG. 1. A total amount of sales to the customer is stored in a Y register 11 through an input terminal W and a gate circuit 10. The data on said total sales amount is held in the Y register 11 by being shifted through the gate circuit 12, 10. When an amount tendered by the customer is delivered to the cash register, then a total amount of sales already stored in the Y register 11 is supplied to an X register 15 by being conducted through transfer gate circuits, 13, 14. The data on said total amount of sales is held in the X register 15 by being shifted through the gate circuits 16, 14. At this time, an amount tendered by the customer is brought through the input terminal W into the Y register 11. Data on the amount tendered by the customer is held in the Y register by being shifted through the gate circuits 12, 10. The amount tendered and that purchased by the customer are supplied to an ADD-SUBTRACT circuit (hereinafter abbreviated as A-S circuit) 19 through gate circuits 17 or 18 respectively to figure out a difference between both amounts, that is, the change to be paid back to the customer. The change amount thus calculated is conducted through an output terminal a of said A-S circuit 19, and gate circuits 16, 14 in turn to be stored in the X register 15. The contents of the Y register 11 are carried through a decoder-driver (D.D) circuit 20 to be indicated in the display section 4 of FIG. 1. The foregoing description refers to the customary method of figuring out the change.

Referential numerals 21 to 29 denote registers in which fixed numbers such as 5,000, 2,000, 1,000, 500, 100, 25, 10, 5 and 1 are always stored. There numbers correspond to the denominations of paper notes and coins generally circulated in the United States of America. The fixed numbers stored in the registers 21 to 29 are delivered to a bus line 39 through the corresponding gate circuits 30 to 38. The bus line 39 is connected to the input terminal C of the A-S circuit 19. The change amount stored in the X register 15 is converted, as seen from the following description, into the numbers of coins and paper notes for the respective denominations in which said change is to be paid back to a customer. These numbers are stored in the Y register 11 to be indicated in the display section 4 ready for easy recognition by the customer.

Figure 3B:
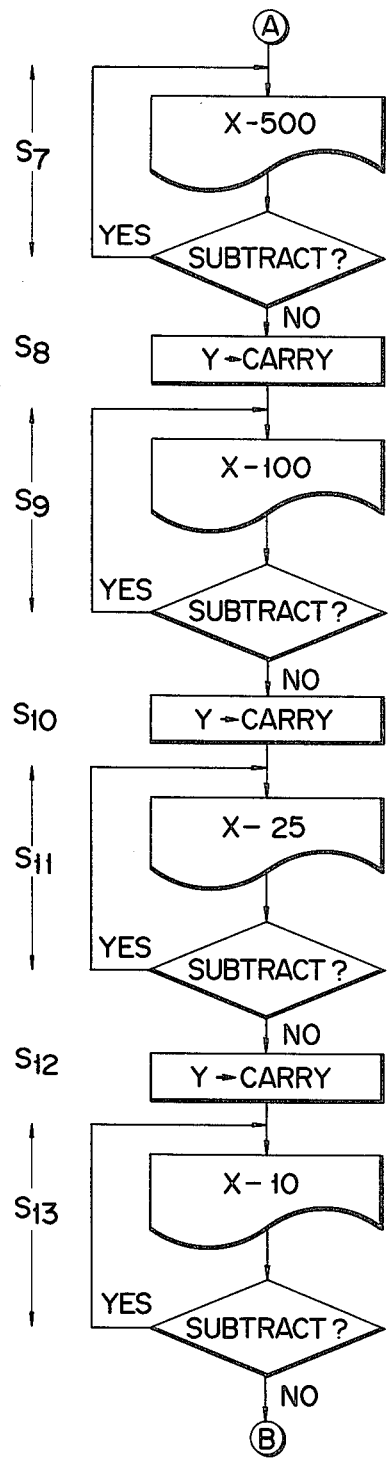
Figure 4B:
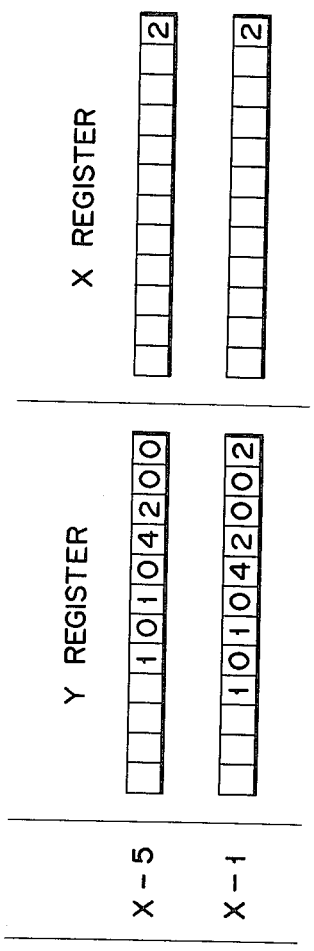
Figure 3C:
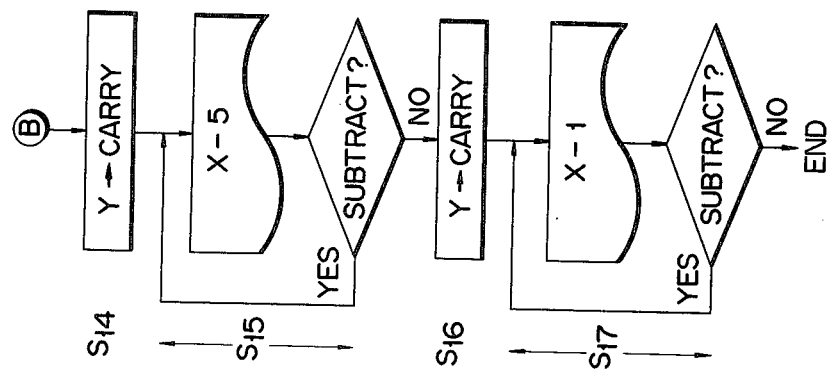

There will now be described the process of converting a change amount into coins and paper notes by reference to the flow clarts of FIGS. 3(A), 3(B) and 3(C) and registered patterns of FIGS. 4(A) and 4(B). Now let it be assumed that a total amount (for example, 23,548 Cents) of purchases made by a customer is stored in the Y register 11 as shown in FIG. 4(A), and the customer has tendered, for example 30,000 Cents for this purchases. As shown from FIG. 4(A), the tendered amount of 30,000 Cents is stored in the Y register 11, and the purchased amount of 23,548 Cents is also stored in the X register 15. The A-S circuit 19 figures out a difference between the tendered amount and purchased amount, that is, the change to be paid back to a customer. The calculated change is stored in the X register 15 (FIG. 4(A)). Under this condition, calculation is made of the numbers of coins and paper notes for the respective denominations into which the change is to be converted. Referring to FIG. 3(A), when a change amount of "6,452" (Cents) (hereinafter the unit of cents is omitted for briefness of description) are stored in the X register 15, then "5,000" (Cents) are subtracted from "6,452" in the A-S circuit 19 (Step $S_1$). A number of subtractions (only "1" in this case) is stored in the Y register 11 through the output terminal b of the A-S circuit 19 and gate circuits 12, 10. In the step $S_1$, a fixed number of "5,000" (Cents) issued from the fixed number register 21 through the corresponding gate circuit 30 is delivered to the input terminal C of the A-S circuit 19 through the bus line 39. At this time, the gate circuit 17 remains closed, preventing the contents of the Y register 11 from being sent forth to the A-S circuit 19. A balance of "1,452" (Cents) arrived at by subtracting "5,000" (Cents) from "6,452" (Cents) (step $S_1$) is stored in the X register 15 through the output terminal a of the A-S circuit 19 and gate circuits 16, 14. If subtraction is impossible in this case, then the "1" (denoting a number of subtractions) stored in the Y register 11 is shifted through a longer route, that is, through the gate circuit 17, A-S circuit 19, and gate circuits 12, 10 to be carried by one digit.

In the succeeding step $S_3$, "2,000" (Cents) are to be subtracted from "1,452" (Cents) stored in the X register 15 as the result of subtraction in the first step $S_1$. In the third step $S_3$, the fixed number of "2,000" (Cents) stored in the register 22 is conducted to the A-S circuit 19 through the gate circuit 31. Since the subtraction of "2,000" (Cents) from "1,452" (Cents) are impossible, no subtraction is carried out in the third step $S_3$. Accordingly, the contents of the Y register 11 is immediately carried by one digit in the fourth step $S_4$. In the fifth step $S_5$, "1,000" (Cents) are subtracted from "1,452" (Cents) stored in the X register 15. In the sixth step $S_6$, a number of subtractions is carried by one digit. Thereafter, operations similar to those described are continued up to the seventeenth step 17, as shown in FIGS. 3 and 4. Last, "101,042,002" (Cents) is stored in the Y register 11. These digits, as counted from the first one, represent the numbers of paper notes for 5,000 Cents or 50 dollars, 2,000 Cents or 20 dollars, 1,000 Cents or 10 dollars, 500 Cents or 5 dollars, 100 Cents or one dollar, 25 Cents (coin), 10 Cents (coin), 5 Cents (coin) and 1 Cent (coin). A series of the above-mentioned digits denoting the numbers of the respective denominations of paper notes and coins are indicated in the display section 4 through the decoder-driver (D.D) circuit 20. As the result, a customer can recognize from the first five digits "10,104" the numbers of paper notes for the respective denominations to be delivered to him from a cash register operator. Coins are automatically discharged from a coin dispenser 9 in the numbers denoted by the last four digits "2,002" for the respective denominations. The data "10,104" on the numbers of the respective denominations of paper notes may be flickered for display at the frequency rate of 1 $H_z$.

What is claimed is:

1. In an electronic change circulation and dispensing apparatus for calculating change based upon a sales amount and a tendered money amount, and automatically dispensing coins as part of said change, the improvement comprising a paper money amount displaying system including:
   calculating means for calculating said change based upon a sales amount and a tendered money amount;
   means coupled to said calculating means for converting said change calculated by said calculating means into the corresponding units of money according to the denominations of the money; and
   display means coupled to said converting means for displaying the number of those of said corresponding units of money which are represented at least by paper money.

2. In an electronic apparatus according to claim 1, the further improvement wherein said display means includes means for displaying the number of those of units of money represented by paper money in blinking fashion.

* * * * *